United States Patent
Hsu

(10) Patent No.: US 10,055,140 B2
(45) Date of Patent: Aug. 21, 2018

(54) METHOD, SYSTEM, AND COMPUTER-READABLE RECORDING MEDIUM FOR AUTOMATED STORAGE TIERING

(71) Applicant: QNAP SYSTEMS, INC., New Taipei (TW)

(72) Inventor: Han-Nung Hsu, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 86 days.

(21) Appl. No.: 15/242,612

(22) Filed: Aug. 22, 2016

(65) Prior Publication Data
US 2017/0336987 A1 Nov. 23, 2017

(30) Foreign Application Priority Data
May 19, 2016 (TW) .............................. 105115624 A

(51) Int. Cl.
*G06F 3/06* (2006.01)
(52) U.S. Cl.
CPC .......... *G06F 3/0611* (2013.01); *G06F 3/0605* (2013.01); *G06F 3/0647* (2013.01); *G06F 3/0653* (2013.01); *G06F 3/0685* (2013.01)
(58) Field of Classification Search
CPC .... G06F 3/0604; G06F 3/0611; G06F 3/0631; G06F 3/0647; G06F 3/0653; G06F 3/0685; G06F 12/0646

USPC .......................................... 711/102, 170, 173
See application file for complete search history.

(56) References Cited

U.S. PATENT DOCUMENTS

| | | | | |
|---|---|---|---|---|
| 2008/0270720 A1* | 10/2008 | Tanabe | .................. | G06F 3/0605 711/162 |
| 2009/0276588 A1* | 11/2009 | Murase | .................. | G06F 3/0608 711/160 |
| 2013/0067187 A1* | 3/2013 | Moss | ..................... | G06F 3/0689 711/170 |
| 2014/0195567 A1* | 7/2014 | Julien | ............... | G06F 17/30306 707/812 |

* cited by examiner

*Primary Examiner* — Gary J Portka
(74) *Attorney, Agent, or Firm* — JCIPRNET

(57) ABSTRACT

A method, a system, and a computer-readable recording medium for automated storage tiering are provided. A temperature level of each data block in all data storage devices with different tier levels is calculated based on its usage level and usage history so as to accordingly calculate a total amount of preserved storage space for all the data storage devices. Next, a storage space of each of the data storage devices is divided into a preserved storage space and a non-preserved storage space according to the total amount of the preserved storage space and a storage capacity of the corresponding data storage device. Each of the data blocks is migrated to the non-preserved storage space in the corresponding data storage device according to its temperature and the tier level of each of the data storage devices.

19 Claims, 4 Drawing Sheets

US 10,055,140 B2

METHOD, SYSTEM, AND COMPUTER-READABLE RECORDING MEDIUM FOR AUTOMATED STORAGE TIERING

CROSS-REFERENCE TO RELATED APPLICATION

This application claims the priority benefit of Taiwan application serial no. 105115624, filed on May 19, 2016. The entirety of the above-mentioned patent application is hereby incorporated by reference herein and made a part of this specification.

TECHNICAL FIELD

The disclosure is related to a technique of automated storage tiering, in particular, to a method, a system, and a computer-readable recording medium for automated storage tiering.

BACKGROUND

The common data storage devices available in the market include a hard driver disk (HDD), formed by a read-and-write magnetic head and a platter, and a solid state disk (SSD), formed by a memory and a control chip. A storage capacity of a HDD would be normally greater than that of a SSD due to its relatively lower cost. On the other hand, a data access rate of the SSD is several times faster than that of the HDD, and the SSD also has advantages of lower power consumption and being unable to be physically destroyed. Hence, a solid state hybrid drive (SSHD) with a hybrid disk architecture has been introduced to a computer system, where the HDD is configured as a basic data storage space, and the SSD is configured as a cache space so as to ensure that access rates and storage capacities both satisfy the user's requirement.

However, the HDD in the SSHD only provides limited storage capacities, and thus how to effectively allocate data storage spaces to let the user feel the advantages of the SSD would be one of the primary concerns for the product developers.

SUMMARY OF THE INVENTION

Accordingly, the disclosure is directed to a method, a system, and a computer-readable recording medium for automated storage tiering, where storage spaces of data storage devices would be effectively allocated to ensure that access rates and storage capacities both satisfy the user's requirement.

The disclosure provides an automated storage tiering method, adapted to a data storage system having multiple data storage devices, where the data storage devices respectively correspond to different tier levels and store multiple data blocks. The method includes to calculate a temperature level of each of the data blocks according to a usage level and a usage history thereof, to calculate a total amount of preserved storage space for each of data storage devices according to the temperature level of each of the data blocks, to divide a storage space of each of the data storage devices into a preserved storage space and a non-preserved storage space according to the total amount of preserved storage space and a storage capacity of each of the data storage devices, and to migrate each of the data blocks to the non-preserved storage space in the corresponding data storage device according to the temperature level of the corresponding data block and the tier level of each of the data storage devices.

According to an embodiment of the disclosure, the step to calculate the usage history of each of the data blocks includes to calculate and set a weighted sum of previous usage levels respectively recorded at previous time points of one of the data blocks as the usage history thereof, where the closer the previous time points are to a current time point, the greater are the weighted values of the corresponding previous usage levels.

According to an embodiment of the disclosure, the step to calculate the temperature level of each of the data blocks according to the usage level and the usage history thereof includes to cluster the data blocks into multiple groups according to the usage level and the usage history of each of the data blocks by using a clustering algorithm so as to identify the temperature level of each of the data blocks.

According to an embodiment of the disclosure, the step to calculate the total amount of preserved storage space for each of the data storage devices includes to obtain a hottest group among the groups, to calculate a total volume of most recent data blocks in the hottest group, and to set the total amount of preserved storage space according to the total volume, where the most recent data blocks are the data blocks generated most recently in the hottest group.

According to an embodiment of the disclosure, after the step to set the total amount of preserved storage space according to the total volume, the method further includes to calculate and set a weighted sum of total amounts of previous preserved storage space respectively recorded at previous time points as a total amount of history preserved storage space and to adjust the total amount of preserved storage space according to the total amount of history preserved storage space, where the closer the previous time points are to a current time point, the greater are the weighted values of the corresponding total amounts of previous preserved storage space.

According to an embodiment of the disclosure, the step to divide the storage space of each of the data storage devices into the preserved storage space and the non-preserved storage space according to the total amount of preserved storage space and the storage capacity of each of the data storage devices includes to calculate a ratio among the storage capacities of the data storage devices, to set the preserved storage space of each of the data storage devices according to the total amount of preserved storage space and the ratio, and to set the storage space excluding the preserved storage space in each of the data storage devices as the non-preserved storage space, where a summation of the preserved storage spaces of the data storage devices is equal to the total amount of preserved storage space.

According to an embodiment of the disclosure, the step to divide the storage space of each of the data storage devices into the preserved storage space and the non-preserved storage space according to the total amount of preserved storage space and the storage capacity of each of the data storage devices includes to set the preserved storage space of each of the data storage devices sequentially according to the tier level thereof and to set the storage space excluding the preserved storage space in each of the data storage devices as the non-preserved storage space, where a summation of the preserved storage spaces of the data storage devices is equal to the total amount of the preserved storage space.

According to an embodiment of the disclosure, the step to migrate each of the data blocks to the non-preserved storage space in the corresponding data storage device according to the temperature level of the corresponding data block and the tier level of each of the data storage devices includes to sort the data blocks from hottest to coldest according to the temperature levels thereof and to migrate each of the data blocks sorted at the end sequentially to the non-preserved storage space of the corresponding data storage device, where the hotter the data blocks are, the higher the tier levels of the data storage devices are the data blocks migrated to.

According to an embodiment of the disclosure, after the step to migrate each of the data blocks to the non-preserved storage space in the corresponding data storage device according to the temperature level of the corresponding data block and the tier level of each of the data storage devices and when a new data block is generated, the method further includes to store the new data block in the preserved storage space in the data storage device with a highest tier level.

The disclosure provides a data storage system includes multiple data storage devices and a processor, where the processor is coupled to the data storage devices. The data storage devices respectively correspond to different tier levels and store multiple data blocks. The processor is configured to calculate a temperature level of each of the data blocks according to a usage level and a usage history thereof, to calculate a total amount of preserved storage space for each of data storage devices according to the temperature level of each of the data blocks, to divide a storage space of each of the data storage devices into a preserved storage space and a non-preserved storage space according to the total amount of preserved storage space and a storage capacity of each of the data storage devices, and to migrate each of the data blocks to the non-preserved storage space in the corresponding data storage device according to the temperature level of the corresponding data block and the tier level of each of the data storage devices.

According to an embodiment of the disclosure, the processor is configured to calculate and set a weighted sum of previous usage levels respectively recorded at previous time points of one of the data blocks as the usage history thereof, where the closer the previous time points are to a current time point, the greater are the weighted values of the corresponding previous usage levels.

According to an embodiment of the disclosure, the processor is configured to cluster the data blocks into multiple groups according to the usage level and the usage history of each of the data blocks by using a clustering algorithm so as to identify the temperature level of each of the data blocks.

According to an embodiment of the disclosure, the processor is configured to obtain a hottest group among the groups, to calculate a total volume of most recent data blocks in the hottest group, and to set the total amount of preserved storage space according to the total volume, where the most recent data blocks are the data blocks generated most recently in the hottest group.

According to an embodiment of the disclosure, the processor is further configured to calculate and set a weighted sum of total amounts of previous preserved storage space respectively recorded at previous time points as a total amount of history preserved storage space and to adjust the total amount of preserved storage space according to the total amount of history preserved storage space, where the closer the previous time points are to a current time point, the greater are the weighted values of the corresponding total amounts of previous preserved storage space.

According to an embodiment of the disclosure, the processor is configured to calculate a ratio among the storage capacities of the data storage devices, to set the preserved storage space of each of the data storage devices according to the total amount of preserved storage space and the ratio, and to set the storage space excluding the preserved storage space in each of the data storage devices as the non-preserved storage space, where a summation of the preserved storage spaces of the data storage devices is equal to the total amount of preserved storage space.

According to an embodiment of the disclosure, the processor is configured to set the preserved storage space of each of the data storage devices sequentially according to the tier level thereof and to setting the storage space excluding the preserved storage space in each of the data storage devices as the non-preserved storage space, where a summation of the preserved storage spaces of the data storage devices is equal to the total amount of the preserved storage space.

According to an embodiment of the disclosure, the processor is configured to sort the data blocks from hottest to coldest according to the temperature levels thereof and to migrate each of the data blocks sorted at the end sequentially to the non-preserved storage space of the corresponding data storage device, where the hotter the data blocks are, the higher the tier levels of the data storage devices are the data blocks migrated to.

According to an embodiment of the disclosure, when a new data block is generated, the processor is further configured to store the new data block in the preserved storage space in the data storage device with a highest tier level.

The disclosure also provides a non-transitory computer-readable recording medium which records computer program to be loaded into a computer storage system to execute the steps of the aforementioned method.

In summary, in the proposed method, system, and computer-readable medium for automated storage tiering, a temperature level of each data block stored in multiple data storage devices is calculated according to the usage level and the usage history of each of the data blocks, and the allocation of data storage spaces and the migration of the data blocks are performed according to tier levels of the data storage devices so as to ensure that access rates and storage capacities both satisfy the user's requirement.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
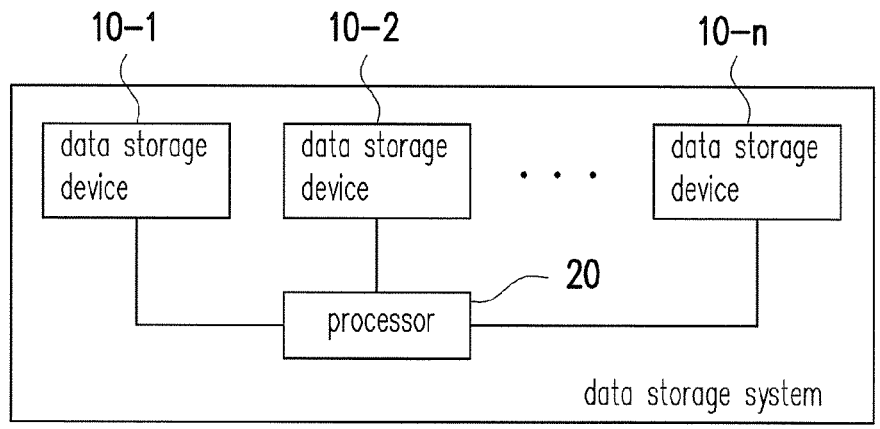
FIG. 1 illustrates a schematic diagram of a data storage system according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the disclosure.

FIG. 1 illustrates a schematic diagram of a data storage system according to an embodiment of the disclosure. It should, however, be noted that this is merely an illustrative example and the disclosure is not limited in this regard. All components of the data storage system and their configurations are first introduced in FIG. 1. The detailed functionalities of the components are disclosed along with FIG. 2.

Referring to FIG. 1, a data storage system 100 includes data storage devices 10-1~10-n and a processor 20. In the present embodiment, the data storage system 100 could be a desktop computer, a laptop computer, a tabular computer, or other computer systems with computing features. In an embodiment, the data storage devices 10-1~10-n and the processor 20 are all built-in in the data storage system 100, where the data storage devices 10-1~10-n are electrically connected to the processor 20 respectively. In another embodiment, the data storage devices 10-1~10-n could also be external devices which are able to be electrically connected to the processor 20 built-in in the data storage system 100 via a transmission line or a hub. The disclosure is not limited in this regard.

The data storage devices 10-1~10-n would be different types of storage mediums and would be classified into different tier levels based on their data access rates, where the data storage devices with faster data access rates correspond to higher tier levels. The data storage devices with higher tier levels could be flash memory storage units with flash memories configured as storage mediums such as solid state disks (SSD), and the data storage devices with lower tier levels could be disk storage units with disks configured as storage mediums such as hard disk drives (HDD).

The processor 20 could be, for example, a central processing unit (CPU) or other programmable devices for general purpose or special purpose such as a microprocessor and a digital signal processor (DSP), a programmable controller, a control chip, an application specific integrated circuit (ASIC), a programmable logic device (PLD) or other similar devices or a combination of above-mentioned devices.

Figure 2:
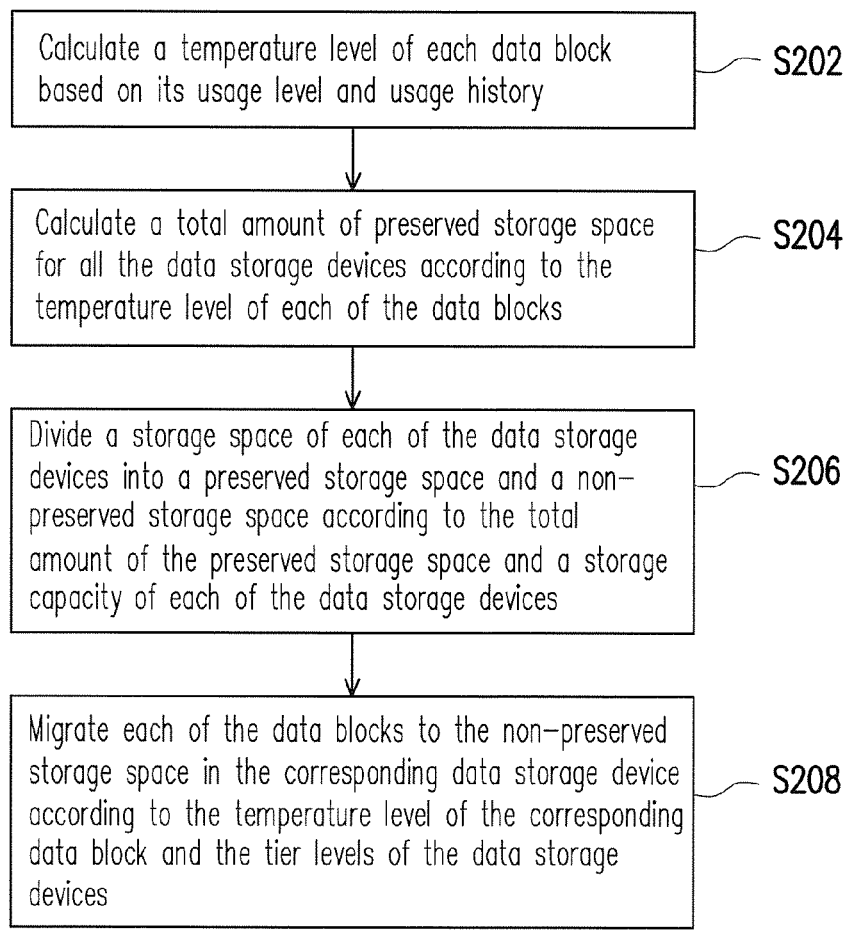
FIG. 2 illustrates a flowchart of an automated storage tiering method according to an embodiment of the disclosure.

FIG. 2 illustrates a flowchart of an automated storage tiering method according to an embodiment of the disclosure. The proposed method is adapted to the data storage system 100 in FIG. 1. For simplicity purposes, the data storage system 100 with only two of the data storage devices 10-1 and 10-2 would be illustrated. The data storage system 100 with more than three data storage devices could be deduced in a similar fashion. In the present embodiment, assume that the data storage device 10-1 is a SSD, and the data storage device 10-2 is a HDD. That is, a data access rate of the data storage device 10-1 is faster than that of the data storage device 10-2. From a cost-saving perspective, assume that a storage capacity of the data storage device 10-2 is higher than that of the data storage device 10-1, and both of the devices stores multiple data blocks. Detailed steps of the proposed method would be illustrated along with each component of the data storage system 100 hereinafter.

Referring to both FIG. 1 and FIG. 2, the processor 20 of the data storage system 100 would first calculate a temperature level of each data block in the data storage device 10-1 and the data storage device 10-2 according to a usage level and a usage history of each of the data blocks (Step S202). To be specific, since the temperature level of each of the data blocks is associated with a frequency and time points of data being accessed (e.g. data reading, data updating, data revision), the processor 20 would obtain the usage level of each of the data blocks according to its data access frequency and its usage history according to its usage levels (referred to as "previous usage levels" hereafter) respectively recorded when the data storage system 100 performed the automated storage tiering process previously at different time points (referred to as "previous time points").

In the present embodiment, the processor 20 could set the number of data access times of each of the data blocks as its usage level and obtain its usage history according to a weighted sum calculated based on its previous usage levels respectively recorded at previous time points, where the closer the previous time points are to a current time point, the greater are the weighted values of the corresponding previous usage levels being assigned to. As an example, the processor 20 could calculate the usage history of each of the data blocks based on Eq.(1):

$$PU_i = \sum_{k=1}^{i-1} \frac{U_k}{2^{i-k}} = \frac{U_1}{2^{i-1}} + \frac{U_2}{2^{i-2}} + \ldots + \frac{U_{i-1}}{2^1} = \frac{U_{i-1} + PU_{i-2}}{2} \quad \text{Eq. (1)}$$

where $PU_i$ denotes a usage history of a data block when the data storage system 100 performs the $i^{th}$ time of the automated storage tiering process, and $PU_i$ denotes a usage level of a data block when the data storage system 100 performs the $k^{th}$ time of the automated storage tiering process.

Next, after the processor 20 obtains the usage level and the usage history of each of the data blocks, it would cluster all the data blocks into multiple groups by using a clustering algorithm to so as to identify the temperature level of each of the data blocks. For example, the processor 20 may identify the temperature level of each of the data blocks based on a schematic diagram of a clustering method as illustrated in FIG. 3 according to an embodiment of the disclosure.

Figure 3:
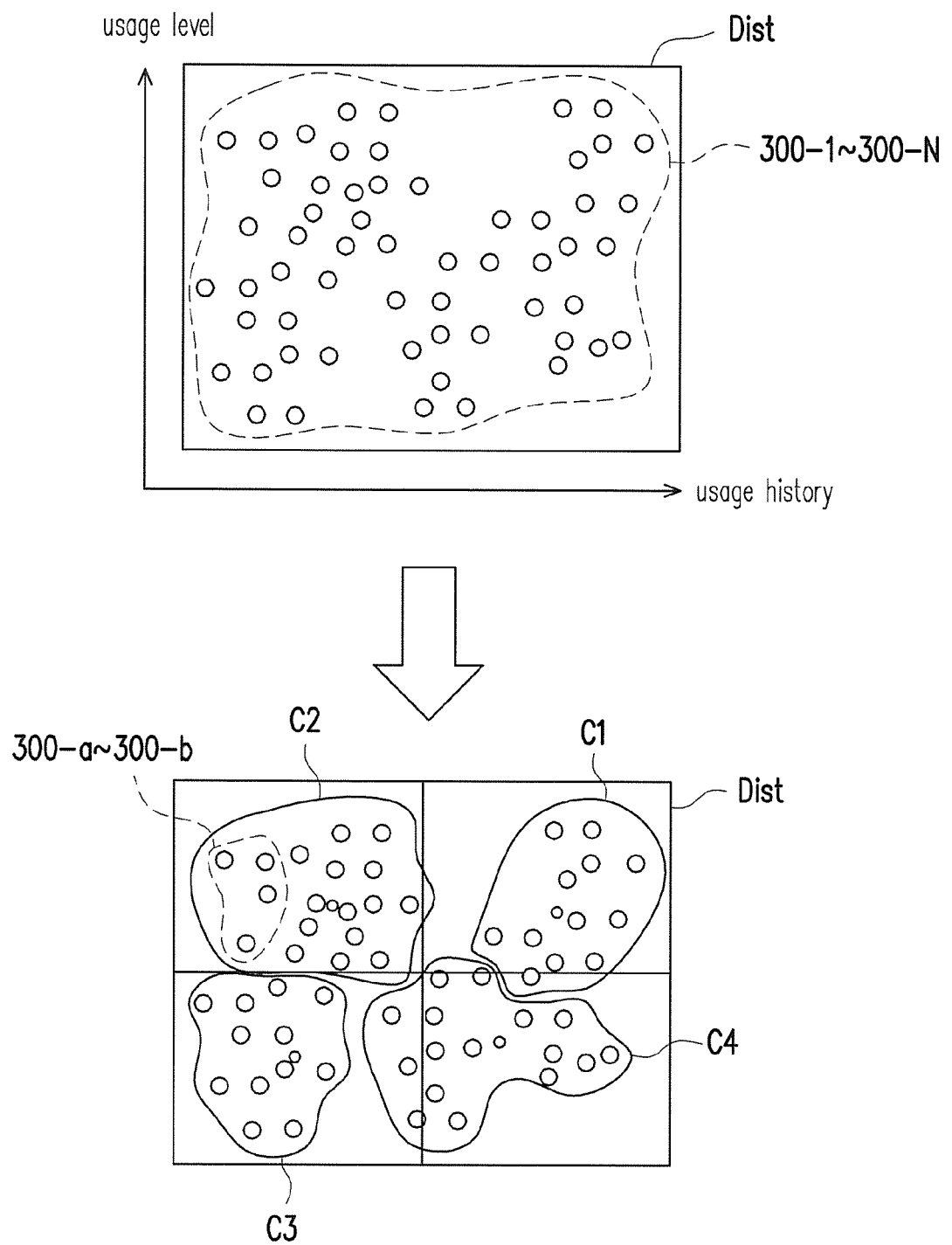
FIG. 3 illustrates a schematic diagram of a clustering method for data blocks according to an embodiment of the disclosure.

Referring to FIG. 3, assume that data blocks 300-a~300-N represent all the data blocks in the data storage device 10-1 and the data storage device 10-2. The processor 20 could obtain a data block distribution diagram Dist according to a usage level and a usage history of each of the data blocks 300-a~300-N and then divide the data blocks 300-1~300-n into four groups C1~C4 by using a k-means clustering algorithm. Herein, the data blocks in the group C2 have the highest usage level and the most recent usage history and could be frequently used, and therefore the group C2 is referred to as "the hottest group". On the other hand, the data blocks in the group C4 have the lowest usage level and the most distant usage history and could be not frequently used, and therefore the group C4 is referred to as "the coldest group".

Revisiting FIG. 2, after the processor 20 of the data storage system 100 obtains the temperature level of each of the data blocks in each of the data storage devices 10-1 and 10-2, it would calculate a total amount of preserved storage space for each of the data storage devices 10-1 and 10-2 accordingly (Step S204) and divide a storage space of each of the data storage devices 10-1 and 10-2 into a preserved storage space and a non-preserved storage space according to the total amount of preserved storage space and a storage capacity of each of the data storage devices 10-1 and 10-2 (Step S206). Herein the preserved storage spaces are preserved for data blocks to be generated in the future, and the non-preserved storage spaces are allocated for the generated data blocks. In the follow-up steps, the processor 20 would effectively allocate the storage spaces for the data storage device 10-1 with a higher tier level and the data storage device 10-2 with a lower tier level so as to ensure that the access rates and the storage capacities both satisfy the user's requirement. Detailed steps would be discussed later on.

In the present embodiment, since all the data blocks are clustered into multiple groups, the processor 20 would obtain the hottest group and calculate a total volume of data blocks which are generated most recently (referred to as "most recent data blocks") in such group so as to accordingly set the total amount of preserved storage space. The so-called most recent data blocks could be the data blocks in the hottest group generated between the current time point and a time point when the data storage system 100 performed the automated storage tiering process for the last time, or could be the data blocks in the hottest group generated between the current time point and a preset time point. As an example in FIG. 3, assume that the data blocks 300-$a$-300-$b$ in the group C2 represent the most recent data blocks. The processor 20 would calculate and set a total volume of the data blocks 300-$a$-300-$b$ as the total amount of preserved storage space.

In order to prevent the total amount of the storage space from being fluctuated whenever the automated storage tiering process is performed, in an embodiment, the processor 20 would further adjust the total amount of the storage space based on a total amount of history preserved storage space. The total amount of history preserved storage space is a weighted sum of total amounts of preserved storage space (referred to as "total amounts of previous preserved storage space" hereafter) respectively recorded at multiple previous time points by the processor 20, where the closer the previous time points are to the current time point, the greater are the weighted values of the corresponding total amounts of previous preserved storage space being assigned to. As an example, the processor 20 could calculate the total amount of history preserved storage space of each of the data blocks based on Eq.(2):

$$PH_i = \sum_{k=1}^{i-1} \frac{P_k}{2^{i-k}} = \frac{P_1}{2^{i-1}} + \frac{P_2}{2^{i-2}} + \ldots + \frac{P_{i-1}}{2^1} \quad \text{Eq. (2)}$$

where $PH_i$ denotes a total amount of history preserved storage space of a data block when the data storage system 100 performs the $i^{th}$ time of the automated storage tiering process, and $P_k$ denotes a total amount of previous storage preserved space of a data block when the data storage system 100 performs the $k^{th}$ time of the automated storage tiering process. Next, the processor 20 could adjust an originally-calculated total amount of preserved storage space based on Eq.(3):

$$P_i' = \frac{P_i + PH_i}{2} \quad \text{Eq. (3)}$$

where $P_i$ and $P_i'$ respectively denote total amounts of preserved storage space before and after the adjustment.

In an embodiment, the processor 20 would calculate a ratio between the storage capacities of the data storage devices 10-1 and 10-2, set their preserved storage spaces according to the total amount of preserved storage space and the ratio, and set the storage space excluding the preserved storage space in each of the data storage devices 10-1 and 10-2 as the non-preserved storage space. Herein, a summation of the preserved storage spaces of the data storage devices 10-1 and 10-2 is equal to the total amount of preserved storage space.

Figure 4A:
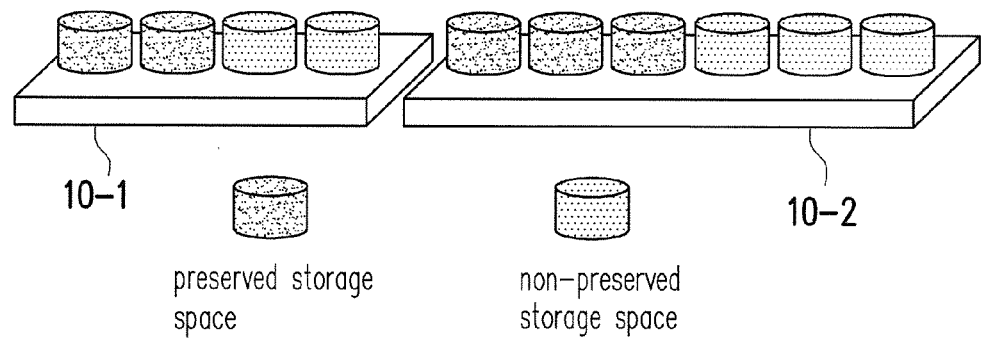
FIG. 4A illustrates a schematic diagram of setting preserved storage spaces and non-preserved storage spaces according to an embodiment of the disclosure.

For example, FIG. 4A illustrates a schematic diagram of setting preserved storage spaces and non-preserved storage spaces according to an embodiment of the disclosure.

Referring to FIG. 4A, assume that the storage capacities of the data storage device 10-1 with a higher tier level and the data storage device 10-2 with a lower tier level are respectively 400 GB and 600 GB. That is, the ratio between the storage capacities of the two devices is 2:3. Assume that the total amount of preserved storage space is 500 GB. The processor 20 would allocate the 500 GB storage space to the data storage devices 10-1 and 10-2 with a ratio of 2:3 as the preserved storage spaces. In other words, there would be 200 GB and 300 GB of the preserved storage spaces respectively in the data storage devices 10-1 and 10-2, and the remaining storage spaces 200 GB and 300 GB in both devices would be set as the non-preserved storage spaces.

It should be noted that, in another embodiment, the processor 20 could set the preserved storage space and the non-preserved storage space in each of the data storage devices 10-1 and 10-2 only based on their tier levels. Similarly, a summation of the preserved storage spaces of the data storage devices 10-1 and 10-2 is equal to the total amount of preserved storage space. For example, the processor 20 could set all the storage space in the data storage device 10-1 with a higher tier level as the preserved storage space, and assign the remaining preserved storage space to the data storage device 10-2 with a lower tier level.

Revisiting FIG. 2, after the processor 20 of the data storage system 100 completes the storage space allocation, it would migrate each of the data blocks to the non-preserved storage space in the corresponding data storage device according to the temperature level of the corresponding data block and the tier levels of the data storage devices 10-1 and 10-2 (Step S208). As mentioned earlier, the preserved storage space is preserved for data blocks to be generated in the future, and the non-preserved storage spaces are allocated for the generated data blocks. Hence, the processor 20 would sort the data blocks from hottest to coldest according to their temperature levels and migrate each of the data blocks sorted at the end sequentially to the non-preserved storage space of the corresponding data storage device, where the hotter the data blocks are, the higher the tier levels of the data storage devices they are migrated to. Therefore, the hotter data blocks (i.e. frequently-used data blocks) could be rapidly accessed.

Figure 4B:
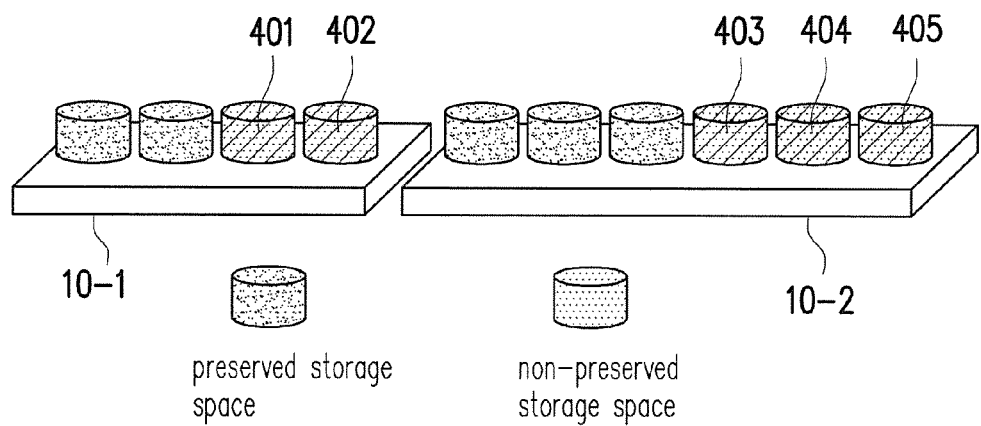
FIG. 4B illustrates a schematic diagram of migrating data blocks according to an embodiment of the disclosure.

For example, FIG. 4B illustrates a schematic diagram of migrating data blocks according to an embodiment of the disclosure. FIG. 4B could be a follow-up embodiment of FIG. 4A.

Referring to FIG. 4B, after the processor 20 completes allocating the preserved storage spaces and the non-preserved storage spaces in the data storage devices 10-1 and 10-2, it would sort the existing data blocks according to the temperature levels. For example, data blocks 401, 402, 403, 404, and 405 are sorted from hottest to coldest. After the hottest data blocks 401 and 402 are migrated to the non-preserved storage space in the data storage device 10-1 with the highest tier level, there is no non-preserved storage space left for the remaining data blocks. Therefore, the data blocks 403, 404, and 405 would be migrated to the non-preserved storage space in the data storage device 10-2 with the next higher tier level.

It should be noted that, when a new data block is generated, the processor 20 would store the new data block in the preserved storage space in the data storage device with the highest tier. As an example in FIG. 4B, the processor 20 would first store the new data block to the preserved storage space in the data storage device 10-1. When there is no preserved storage space left in the data storage device 10-1, the processor 20 would store the new data block to the preserved storage space in the data storage device 10-2 with the next higher tier level.

Figure 5:
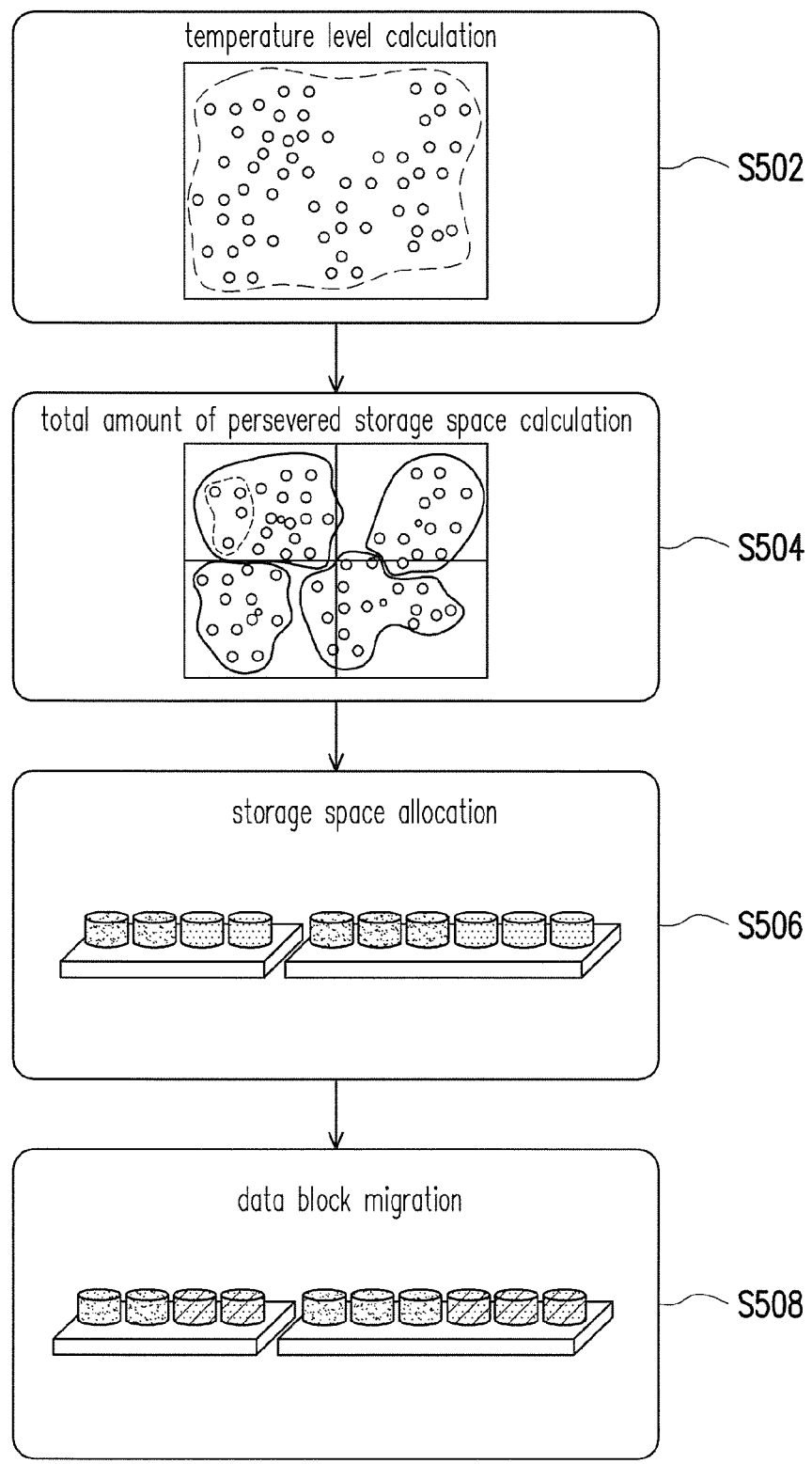
FIG. 5 illustrates a functional block flowchart of an automated storage tiering method according to an embodiment of the disclosure.

The aforementioned automated storage tiering method could be summarized in terms of a functional block flowchart as illustrated in FIG. 5 according to an embodiment of the disclosure.

Referring to FIG. 5, a temperature level calculation step S502 would be performed on each of the data storage blocks 10-1~10-n in the data storage system 100 according to its usage level and usage history, and a total amount of preserved storage space calculation step S504 would be performed. Next, a storage space allocation step S506 would be performed according to the total amount of storage space and a storage capacity of each of the data storage devices 10-1~10-n so as to respectively divide the storage space in each of the data storage devices 10-1~10-n into a preserved storage space and non-preserved storage space. Next, a data block migration step S508 would be performed according to the temperature levels of the data blocks and the tier levels of the data storage devices 10-1~10-n so as to migrate each of the data blocks to the non-preserved storage space in the corresponding data storage device. Then, this completes the current automated storage tiering process on the data storage device 10-1~10-n. Details of Steps S502-S508 could refer to the related description in the previous paragraphs and would not be repeated herein.

The disclosure also provides a non-transitory computer readable medium, which records computer program to be loaded into a data storage system to execute the steps of the aforementioned method. The computer program is composed of a plurality of program instructions (for example, an organization chart, establishing program instruction, a table approving program instruction, a setting program instruction, and a deployment program instruction, etc.), and these program instructions are loaded into the processor 20 of the data storage system 100 and executed by the same to accomplish various steps of the automated storage tiering method on the data storage devices 10-1~10-n.

In summary, in the proposed method, system, and computer-readable medium for automated storage tiering, a temperature level of each data block stored in multiple data storage devices is calculated according to the usage level and the usage history of each of the data blocks, and the allocation of data storage spaces and the migration of the data blocks are performed according to tier levels of the data storage devices so as to ensure that access rates and storage capacities both satisfy the user's requirement.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An automated storage tiering method, adapted to a data storage system having a plurality of data storage devices, wherein each of data storage devices respectively corresponds to a different tier level and is configured to store a plurality of data blocks, and wherein the automated storage tiering method comprises the following steps:
    calculating a temperature level of each of the data blocks according to a usage level and a usage history thereof;
    calculating a total aggregate amount of preserved storage space for all of the data storage devices according to the temperature levels of all of the data blocks in all of the data storage devices;
    dividing a storage space of each of the data storage devices into a preserved storage space and a non-preserved storage space according to the total aggregate amount of preserved storage space for all of the data storage devices and a storage capacity of each of the data storage devices; and
    migrating each of the data blocks to the non-preserved storage space in the corresponding data storage device according to the temperature level of the corresponding data block and the tier level of each of the data storage devices.

2. The automated storage tiering method according to claim 1, wherein the step of calculating the usage history of each of the data blocks comprises:
    calculating and setting a weighted sum of a plurality of previous usage levels respectively recorded at a plurality of previous time points of one of the data blocks as the usage history thereof, wherein the closer the previous time points are to a current time point, the greater are the weighted values of the corresponding previous usage levels.

3. The automated storage tiering method according to claim 1, wherein the step of calculating the temperature level of each of the data blocks according to the usage level and the usage history thereof comprises:
    clustering the data blocks into a plurality of groups according to the usage level and the usage history of each of the data blocks by using a clustering algorithm so as to identify the temperature level of each of the data blocks.

4. The automated storage tiering method according to claim 3, wherein the step of calculating the total aggregate amount of preserved storage space for all of the data storage devices comprises:
    obtaining a hottest group among the groups;

calculating a total volume of a plurality of most recent data blocks in the hottest group, wherein the most recent data blocks are the data blocks generated most recently in the hottest group; and setting the total aggregate amount of preserved storage space according to the total volume.

5. The automated storage tiering method according to claim 4, wherein after the step of setting the total aggregate amount of preserved storage space according to the total volume, the automated storage tiering method further comprises:

calculating and setting a weighted sum of a plurality of total amounts of previous preserved storage space respectively recorded at a plurality of previous time points as a total amount of history preserved storage space, wherein the closer the previous time points are to a current time point, the greater are the weighted values of the corresponding total amounts of previous preserved storage space; and adjusting the total aggregate amount of preserved storage space according to the total amount of history preserved storage space.

6. The automated storage tiering method according to claim 1, wherein the step of dividing the storage space of each of the data storage devices into the preserved storage space and the non-preserved storage space according to the total aggregate amount of preserved storage space for all of the data storage devices and the storage capacity of each of the data storage devices comprises:

calculating a ratio among the storage capacities of the data storage devices;

setting the preserved storage space of each of the data storage devices according to the total aggregate amount of preserved storage space and the ratio, wherein a summation of the preserved storage spaces of the data storage devices is equal to the total aggregate amount of preserved storage space; and setting the storage space excluding the preserved storage space in each of the data storage devices as the non-preserved storage space.

7. The automated storage tiering method according to claim 1, wherein the step of dividing the storage space of each of the data storage devices into the preserved storage space and the non-preserved storage space according to the total aggregate amount of preserved storage space for all of the data storage devices and the storage capacity of each of the data storage devices comprises:

setting the preserved storage space of each of the data storage devices sequentially according to the tier level thereof, wherein a summation of the preserved storage spaces of the data storage devices is equal to the total aggregate amount of the preserved storage space; and setting the storage space excluding the preserved storage space in each of the data storage devices as the non-preserved storage space.

8. The automated storage tiering method according to claim 1, wherein the step of migrating each of the data blocks to the non-preserved storage space in the corresponding data storage device according to the temperature level of the corresponding data block and the tier level of each of the data storage devices comprises:

sorting the data blocks from hottest to coldest according to the temperature levels thereof; and migrating each of the data blocks sorted at the end sequentially to the non-preserved storage space of the corresponding data storage device, wherein the hotter the data blocks are, the higher the tier levels of the data storage devices are the data blocks migrated to.

9. The automated storage tiering method according to claim 1, wherein after the step of migrating each of the data blocks to the non-preserved storage space in the corresponding data storage device according to the temperature level of the corresponding data block and the tier level of each of the data storage devices, the automated storage tiering method further comprises:

when a new data block is generated, storing the new data block in the preserved storage space in the data storage device with a highest tier level.

10. A data storage system comprising:

a plurality of data storage devices, configured to store a plurality of data blocks, wherein each of the data storage devices corresponds to a different tier level;

a processor, coupled to the data storage devices and configured for:

calculating a temperature level of each of the data blocks according to a usage level and a usage history thereof;

calculating a total aggregate amount of preserved storage space for all of the data storage devices according to the temperature levels of all of the data blocks in all of the data storage devices;

dividing a storage space of each of the data storage devices into a preserved storage space and a non-preserved storage space according to the total aggregate amount of preserved storage space for all of the data storage devices and a storage capacity of each of the data storage devices; and migrating each of the data blocks to the non-preserved storage space in the corresponding data storage device according to the temperature level of the corresponding data block and the tier level of each of the data storage devices.

11. The data storage system according to claim 10, wherein the processor is configured for calculating and setting a weighted sum of a plurality of previous usage levels respectively recorded at a plurality of previous time points of one of the data blocks as the usage history thereof, wherein the closer the previous time points are to a current time point, the greater are the weighted values of the corresponding previous usage levels.

12. The data storage system according to claim 10, wherein the processor is configured for clustering the data blocks into a plurality of groups according to the usage level and the usage history of each of the data blocks by using a clustering algorithm so as to identify the temperature level of each of the data blocks.

13. The data storage system according to claim 12, wherein the processor is configured for obtaining a hottest group among the groups, calculating a total volume of a plurality of most recent data blocks in the hottest group, and setting the total aggregate amount of preserved storage space according to the total volume, wherein the most recent data blocks are the data blocks generated most recently in the hottest group.

14. The data storage system according to claim 13, wherein the processor is further configured for calculating and setting a weighted sum of a plurality of total amounts of previous preserved storage space respectively recorded at a plurality of previous time points as a total amount of history preserved storage space and adjusting the total aggregate amount of preserved storage space according to the total amount of history preserved storage space, wherein the closer the previous time points are to a current time point, the greater are the weighted values of the corresponding total amounts of previous preserved storage space.

15. The data storage system according to claim 10, wherein the processor is configured for calculating a ratio among the storage capacities of the data storage devices, setting the preserved storage space of each of the data storage devices according to the total aggregate amount of preserved storage space and the ratio, and setting the storage space excluding the preserved storage space in each of the data storage devices as the non-preserved storage space, wherein a summation of the preserved storage spaces of the data storage devices is equal to the total aggregate amount of preserved storage space.

16. The data storage system according to claim 10, wherein the processor is configured for setting the preserved storage space of each of the data storage devices sequentially according to the tier level thereof and setting the storage space excluding the preserved storage space in each of the data storage devices as the non-preserved storage space, wherein a summation of the preserved storage spaces of the data storage devices is equal to the total aggregate amount of the preserved storage space.

17. The data storage system according to claim 10, wherein the processor is configured for sorting the data blocks from hottest to coldest according to the temperature levels thereof and migrating each of the data blocks sorted at the end sequentially to the non-preserved storage space of the corresponding data storage device, wherein the hotter the data blocks are, the higher the tier levels of the data storage devices are the data blocks migrated to.

18. The data storage system according to claim 10, wherein when a new data block is generated, the processor is further configured for storing the new data block in the preserved storage space in the data storage device with a highest tier level.

19. A non-transitory computer-readable recording medium, storing programs to be loaded into a data storage system having a plurality of data storage devices to perform steps of:
calculating a temperature level of each data block in the data storage devices according to a usage level and a usage history thereof;
calculating a total aggregate amount of preserved storage space for all of the data storage devices according to the temperature levels of all of the data blocks in all of the data storage devices;
dividing a storage space of each of the data storage devices into a preserved storage space and a non-preserved storage space according to the total aggregate amount of preserved storage space for all of the data storage devices and a storage capacity of each of the data storage devices; and
migrating each of the data blocks to the non-preserved storage space in the corresponding data storage device according to the temperature level of the corresponding data block and the tier level of each of the data storage devices.

* * * * *